DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 7

T911,001

DURABLE-PRESS TEXTILES OF IMPROVED STAIN RELEASE

Howard M. Lewis, 1912 Hermitage Drive 37664, and Forrest F. Schrum, Jr., 839 Sir Echo Drive 37663, both of Kingsport, Tenn.

Continuation of abandoned application Ser. No. 845,878, July 29, 1969. This application Mar. 15, 1971, Ser. No. 124,588

Int. Cl. D06m *9/00*

U.S. Cl. 8—115.6

No Drawing. 19 Pages Specification

Durable-press, polyester-cellulosic blend textile material of improved stain release properties are prepared by impregnating said textile material with a composition comprising (A) a surface active agent selected from a polyalkylene glycol ether of bis(alkyl-substituted hydroxyphenyl)methane or the condensation product of castor oil and ethylene oxide (B) a carbamate compound having the structure:

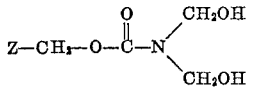

wherein Z is H, an alkyl of 1 to 2 carbon atoms, $HOCH_2$— or $CH_3O$— and (C) a softener comprising the monomeric condensation product of a fatty acid having 10 to 18 carbon atoms and a polyethylene glycol.